United States Patent [19]

Bentley

[11] Patent Number: 5,611,695
[45] Date of Patent: Mar. 18, 1997

[54] ENCLOSED TRAILER TOW CONNECTOR WITH REAR LOCKING WEDGE WIRE RETAINER

[75] Inventor: Daniel L. Bentley, Brownstown, Mich.

[73] Assignee: United Technologies Automotive, Inc., Dearborn, Mich.

[21] Appl. No.: 343,176

[22] Filed: Nov. 22, 1994

[51] Int. Cl.⁶ .................................................. H01R 33/00
[52] U.S. Cl. ............................................. 439/35; 439/131
[58] Field of Search ............................... 439/34, 35, 341, 439/131, 133, 135

[56] References Cited

U.S. PATENT DOCUMENTS

| | | | |
|---|---|---|---|
| 4,984,998 | 1/1991 | Duncan et al. | 439/595 |
| 5,230,552 | 6/1993 | Schipper et al. | 439/131 |
| 5,365,176 | 11/1994 | Miller | 439/131 |
| 5,417,583 | 5/1995 | Ishizaki et al. | 439/459 |
| 5,427,548 | 6/1995 | Yagi et al. | 439/595 |

*Primary Examiner*—David L. Pirlot
*Attorney, Agent, or Firm*—Howard & Howard

[57] ABSTRACT

A connector for supplying electrical connections to a towed vehicle includes a housing structure that encloses the electrical connections in a stowed position. The electrical connections are thus protected from the environment. The connector is secured to the towing vehicle, and properly positions the electrical connections. When it is desired to attach a towed vehicle to the electrical connector, the electrical connector is easily moved to an access position where access is provided to the electrical connections. The connector preferably includes a moving plate which is secured to a fixed base, and carries the wires between the stowed and access positions. Further, the moving plate preferably includes a locking wedge which snaps onto the moving plate to bias locking fingers to lock the wires into the connector at their appropriate positions.

20 Claims, 2 Drawing Sheets

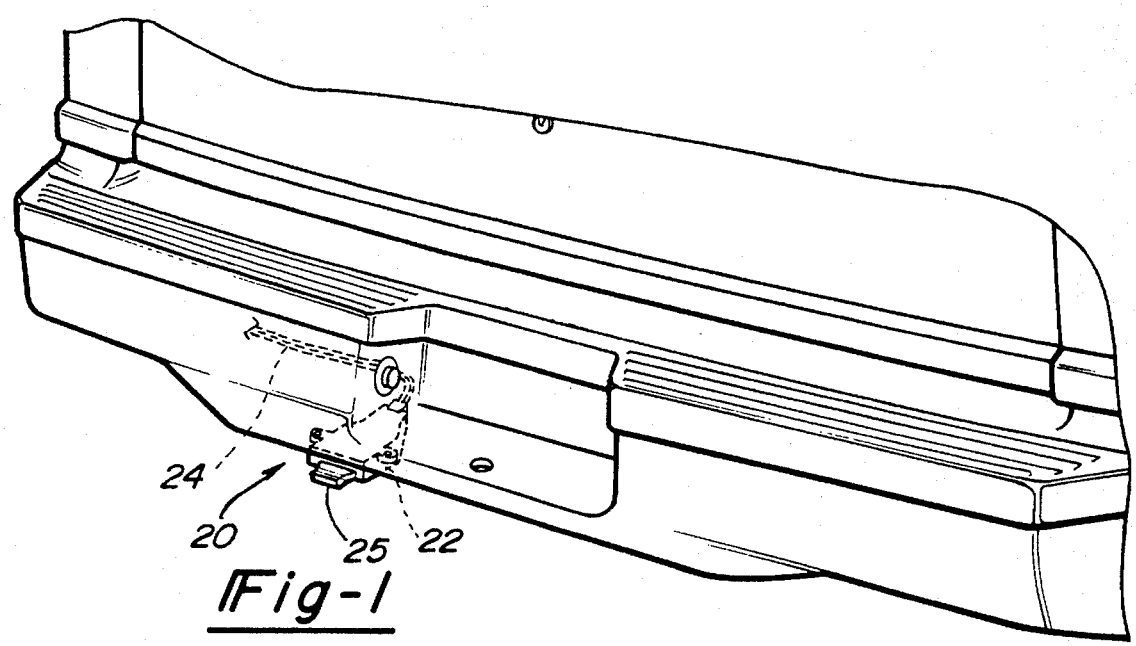
Fig-1
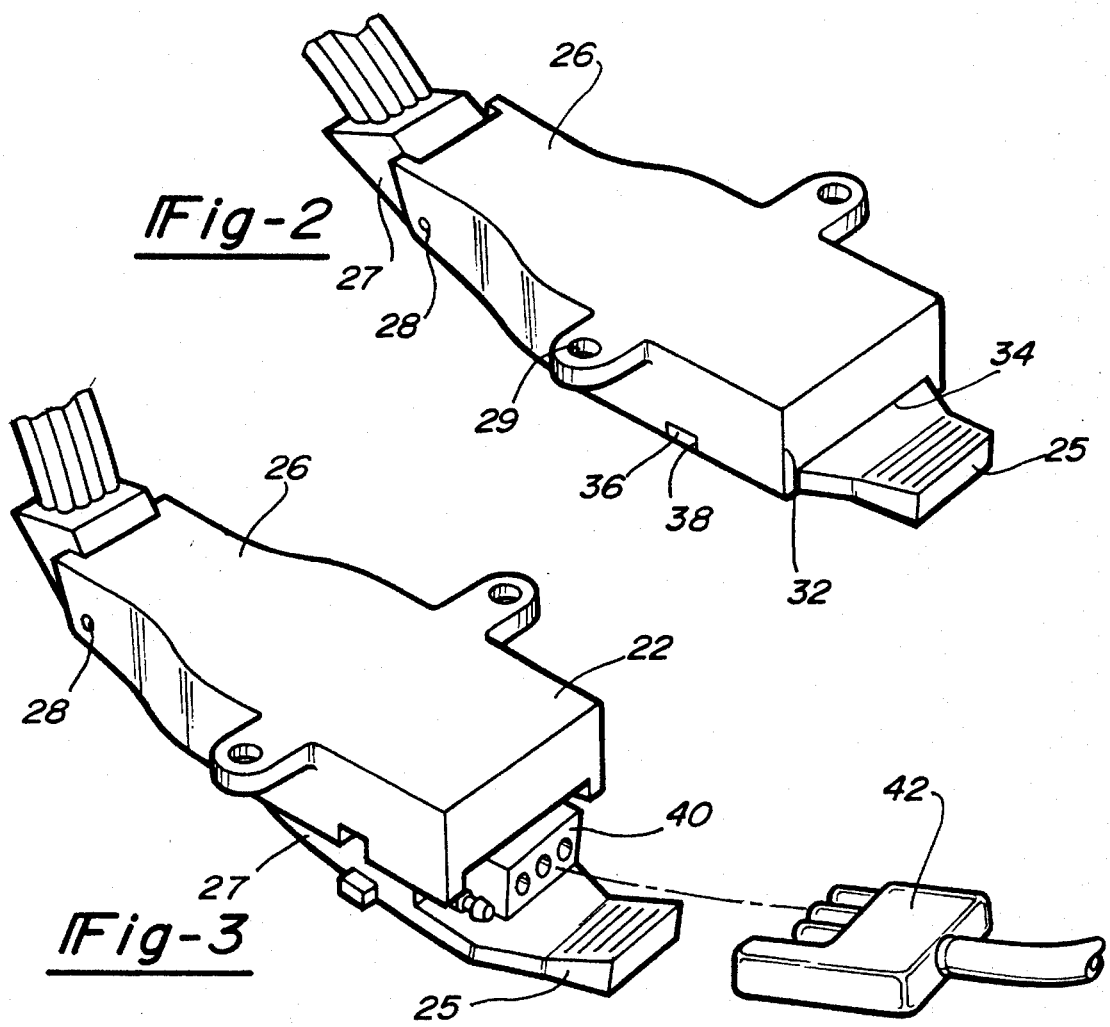
Fig-2
Fig-3

5,611,695

ENCLOSED TRAILER TOW CONNECTOR WITH REAR LOCKING WEDGE WIRE RETAINER

This invention relates to an electrical connector for a towed vehicle having enclosed electrical connections. In addition, this invention includes improvements for securing wires within a connector structure.

In the prior art, it is known to provide an electrical connector attachment for connection to a towed vehicle. The attachment typically includes a cable received in the trunk of the towing vehicle which is removed and connected to a vehicle which is being towed. It is sometimes difficult for an unskilled operator to properly orient the connections to the towed vehicle. The connections are removed from the trunk, and the operator must properly orient the loose connections from both the towed and towing vehicle. The difficulty in properly orienting the connectors is one of the biggest customer complaints relative to such connections. Problems also arise because the connections are not fully protected while not in use.

Brackets for the connections have been proposed. The brackets are an attempt to provide a fixed orientation for the connections. However, the brackets have typically exposed the electrical connections to the environment. The environment to which the towing vehicle will be exposed to will include rain, snow, etc. As such, it is desirable to protect the electrical connections from the environment. The prior art has not provided the twin benefits of a fixed location for the electrical connection along with protecting the connections from the environment.

In addition, in assembling electrical connectors, small wedges have typically been used to bias locking fingers into a receiving space on the wires or their terminals. The relatively small sizes of the wedges, and the relatively remote locations where the locking fingers are typically located, have made such assembly somewhat difficult. Thus, there has been a need for a more easily utilizable locking wedge arrangement.

SUMMARY OF THE INVENTION

In a disclosed embodiment of this invention, an electrical connector for connection to a towed vehicle is secured to a mount base affixed to the underside of a vehicle bumper. The electrical connector is pivotally attached to the mount base, and is easily moved from a stowed position when not in use, to an access position when it is desired to attach a towed vehicle to the connections. In the stowed position, the electrical connections are fully enclosed in the mount base, thus protecting the connections from the environment.

In a preferred embodiment of this invention, the mount base is bolted to the underside of a vehicle, and includes a forward end enclosing the electrical connections in the stowed position. The electrical connections are mounted on a pivoting moving plate which includes a handle extending forwardly of the mount base forward end. The handle facilitates the pivoting movement of the moving plate between the stowed and access positions. In the access position, the connector is accessible for connection to the electrical connector of a towed vehicle. Moreover, the connections within the connector are positively positioned in the proper orientation on the moving plate to insure that the connections are properly orientated and properly made.

In other features of this invention, a locking wedge plate is mounted to the plate to secure the wires to the moving plate. The moving plate preferably includes a series of ridges defining wells, with the wells each being associated with one of the wires leading to connections at a forward end of the moving plate. The wires extend within the wells. The locking wedge includes an ear which is snapped into a recess adjacent the wells. The locking wedge thus holds the wires in the wells, securing them in the proper position. The wedge further includes at least one finger wedge extending forwardly. The finger wedge is positioned between locking fingers formed on the moving plate. The locking fingers include structure for locking the wires in position on the moving plate. In one disclosed example, there are four wires and four locking fingers. The wedge plate includes two finger wedges, with each finger wedge being received between two locking fingers. The finger wedges bias the locking fingers outwardly into a locking space on the wires. In this way, the wires are securely retained in the proper position on the electrical connector.

Since the wedge plate carries the finger wedges, the overall wedge device is relatively large compared to prior art wedges. The wedge fingers are easily moved along with the remainder of the wedge plate into the proper position where they force the locking fingers into the locking space on the respective wires. In this way, the improved wedge plate simplifies the assembly of an electrical connector.

In a method of assembling the connector of the present invention, the wires are initially placed in the wells on the moving plate, and moved between the locking fingers and into respective openings in the forward end of the moving plate. The finger wedges are forced between the locking fingers, driving the fingers into locking spaces on the wires. The wires are thus securely maintained in the proper position on the moving plate. The wedge plate is then snapped into the recess, securing the wires in their respective wells.

These and other features of the present invention will be best understood from the following specification and drawings, of which the following is a brief description.

BRIEF DESCRIPTION OF THE DRAWINGS

FIG. 1 is a perspective view of the rear of a vehicle incorporating the present invention.

FIG. 2 is a perspective view of a towed vehicle electrical connector in a stowed position.

FIG. 3 is a view of the connector shown in FIG. 2, but moved to an access position.

DETAILED DESCRIPTION OF A PREFERRED EMBODIMENT

Figure 4:
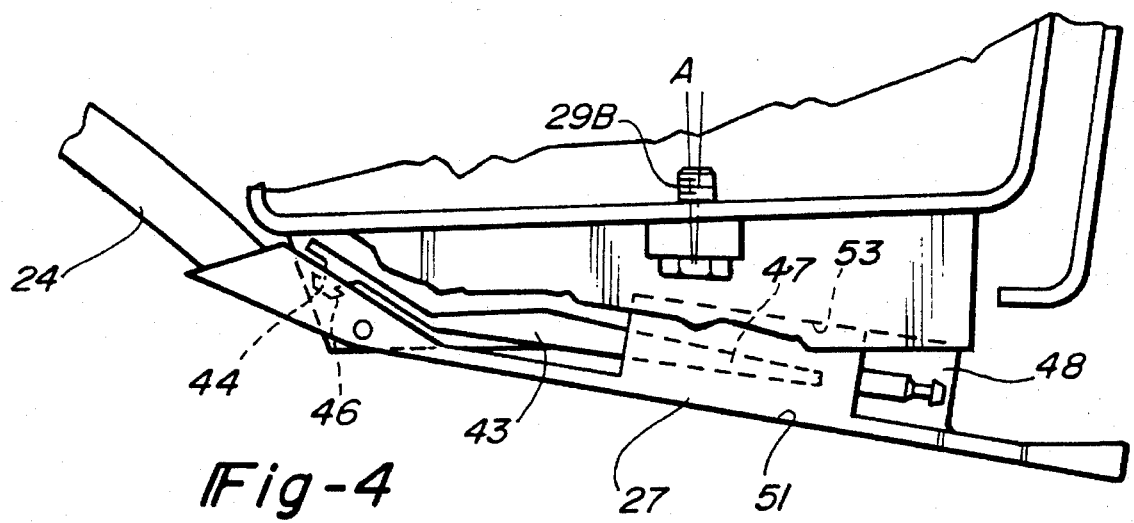
FIG. 4 is a cross-sectional view through a portion of the connector of the present invention.

FIG. 1 shows a towed vehicle electrical connector system 20 incorporating a connector 22 attached to a wire harness 24. Wire harness 24 supplies electrical connections between the towing vehicle 23, and a towed vehicle, not shown. Connector 22 includes a handle 25. Connector 22 is shown in a stowed position with the electrical connections maintained in an enclosed housing protected from the environment. The environment beneath the bumper of a vehicle is hostile, and if electrical connections were permanently attached, and exposed to the environment, they could quickly become damaged. Thus, the present invention permanently attaches the electrical connections at a location on the bumper of the towed vehicle 23, but provides protection to the connections in the form of shelter in the stowed position, such as shown in FIG. 1. Handle 25 facilitates easy movement of the connector 22 between the stowed and access positions.

As shown in FIG. 2, with connector 22 in the stowed position, a fixed base 26 encloses the electrical connections. Fixed base 26 is connected to a moving plate 27 at a pivot connection 28. Bolt holes 29 allow fixed base 26 to be bolted to the towing vehicle 23, such as at a location beneath the bumper.

Handle 25 extends forwardly of a forward end 32 of the fixed base 26. A notch 34 at the forward end 32 of fixed base 26 receives handle 25. Similarly, a tab 36 on moving plate 27 is received in a recess 38 on fixed base 26. As shown in the stowed position, the electrical connections are sheltered from the environment.

When it is desired to attach electrical connections from a towed vehicle to the towing vehicle 23, then handle 25 is pivoted downwardly, and moving plate 27 pivots at pivot joint 28 relative to fixed base 26. The connector 22 is then in the access position, as shown in FIG. 3. As shown in FIG. 3, the electrical connections, shown generally at 40, move with the moving plate 27 and are now accessible to a series of connections 42 from the towed vehicle. Note also that the connections 40 are properly aligned in a known position such that an operator will be able to easily attach the connections.

In the access position shown in FIG. 3, a rear portion of moving plate 27 abuts a portion of fixed base 26. This prevents further downward movement of moving plate 27. Moving plate 27 will be at a position such that access to connections 40 will be provided when the rear portion hits this stop position. Further unnecessary downward movement of moving plate 27 will be prevented. In this way, the exposure of the connections in the access position will also be limited to only the extent necessary. This feature is achieved by extending the rear of moving plate 27 rearwardly of the pivot connection 28.

In the prior art, unskilled vehicle owners have sometimes become confused in properly connecting the connections between a towed vehicle and a towing vehicle. This confusion has grown from the difficulty in properly orientating the connections relative to each other. By fixing the electrical connections within the moving plate 27, the present invention has addressed and overcome this difficulty.

At the same time, the electrical connections 40 are maintained in an enclosed protected environment, free from exposure to the atmosphere until needed. When it is desired to attach a towed vehicle to the towing vehicle 23, handle 25 allows easy movement between the stowed and access positions, and the easy attachment of connections 40 and 42.

The structure of the electrical connector 22 will now be described with reference to FIGS. 4–6. As shown in FIG. 4, moving plate 27 also includes a wedge plate 43. Wedge plate 43 includes a locking ear 44 which is snapped into a recess 46 on moving plate 27. Finger wedges 47 extend forwardly of the wedge plate 43 for a purpose that will be described below. Note that for ease of understanding of the structure of the locking plate 43 in FIG. 4, the wires leading between wire harness 24 and the forward end of the moving plate 27, and specifically connection 40, have been eliminated. A top wall 53 and a bottom wall 51 are formed adjacent and behind connector 40. The details of the wires will be clear from FIG. 5.

In addition, in the mounted position, the center line of bolt hole 29, and bolt 29b, is offset from the vertical by a small angle A. By offsetting this bolt angle, any moisture accumulating adjacent to the bolt hole will tend to run off the bolt, which will not tend to rust in the bolt hole.

Figure 5:
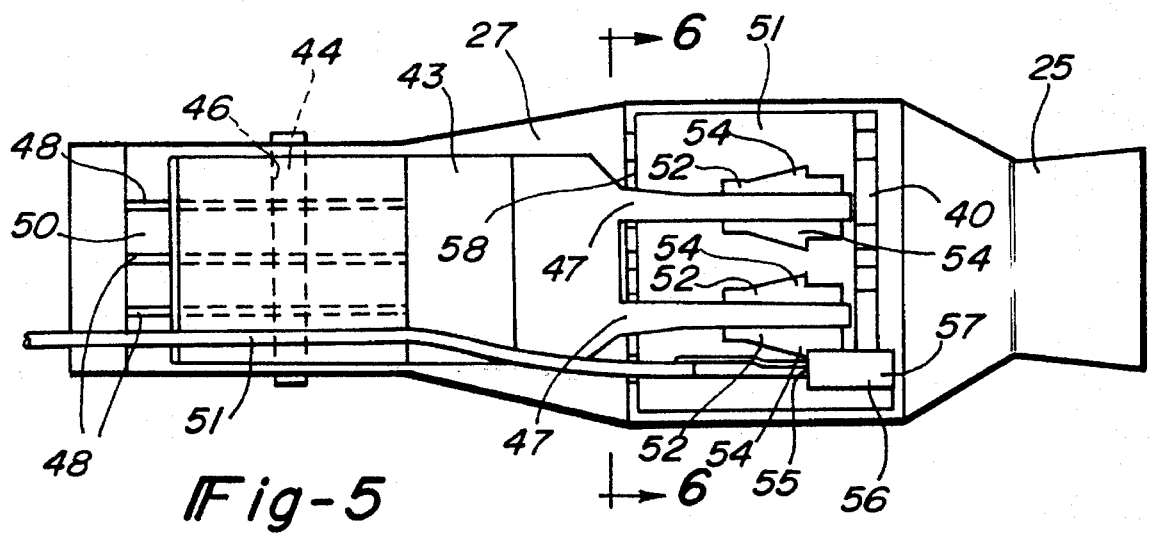
FIG. 5 is a top view of a portion of the connector of the present invention.
Figure 6:
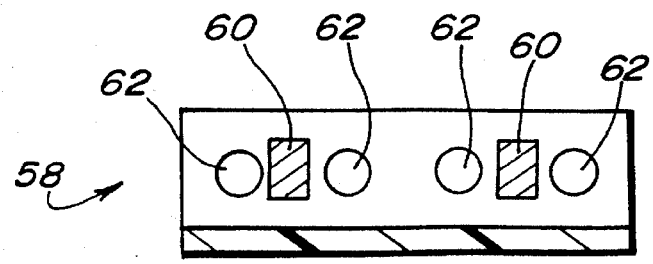
FIG. 6 is a view along line 6—6 as shown in FIG. 5.

As shown in FIG. 5, moving plate 27 incorporates a plurality of ridges 48 defining several wells 50. Wires, such as wire 51, are each positioned in a respective well 50. When ear 44 from wedge plate 43 is snapped into recess 46, the wires are held within their respective wells. The wedge plate 43 extends forwardly to two finger wedges 47. A plurality of locking fingers 52 are formed extending upwardly from bottom wall 51 of moving plate 27. The locking fingers 52 could also be formed from top wall 53 of moving plate 27. Locking fingers 52 are resilient plastic members, and include a locking structure 54 which is received in a locking space 55 adjacent the end 56 of a terminal 57 attached to a forward end of wire 51. In this way, finger wedges 47 force locking fingers 52 into locking space 55, securing terminal 56 within the connector forward body 40.

While wedge structures have been utilized in the prior art, the particular structure of the wedge plate is novel, and increase the ease of assembly of the connector 22. When assembling the connector 22 according to the present invention, wire 51 is initially placed on the moving plate 27 by aligning wire 51 in a well 50. The wire 51 extends through a rear wall 58 of the moving plate 27. Rear wall 58 is formed as a separate piece from the remainder of moving plate, and has a configuration such as is shown in FIG. 6. As shown, rear wall 58 includes two openings 60 for receipt of the wedge fingers 47 and four openings 62 for receipt of the wires 51 and their respective terminals 56. The wires are moved through their respective openings 62, and into the forward connector 40. There may also be guide structure between rear wall 58 and connector plate 40 to guide the wires 51. Such guide structure has been eliminated in these Figures to allow clear illustration of the inventive aspects. When wires 51 are initially inserted, locking fingers 52 are biased to their relaxed position, and are not received in the locking space 55. Rather, the locking fingers 52 are positioned toward the opposed locking fingers from the position shown in FIG. 5. Once the wires are all properly positioned on moving plate 27, locking wedge 43 is then attached to the moving plate 27. Initially, the finger wedges 46 are moved through openings 60 and forwardly until they bias the locking fingers 52 outwardly into the locking spaces 55 adjacent to the terminals 56. In the disclosed embodiment, the locking space 55 is merely the space behind the terminal 56. A worker of ordinary skill in the art would recognize that other types of locking fingers and locking spaces could be substituted for this connection. The wedge plate 43 is then snapped to the locking plate 27 by forcing ear 44 into recess 46. At that time, the moving plate 27 is fully assembled and it may then be attached to the fixed base 26.

The inventive structure of the electrical connector and, in particular, the wedge plate 43 insures that the assembly of the electrical connector is relatively easy and that the wires and their connections are properly and securely positioned.

Although a preferred embodiment of this invention has been disclosed, a worker of ordinary skill in the art would recognize that certain modifications would come within the scope of this invention. For that reason, the following claims should be studied to determine the true scope and content of this invention.

I claim:

1. An electrical connector for a towed vehicle comprising:

a base to be secured to a towing vehicle;

a moving plate fixed to said base;

electrical connections fixed to one of said base and said moving plate, said moving plate being movable relative to said base from a stowed position to an access position, said electrical connections being protected and enclosed by the combination of said moving plate and said base when in said stowed position, and being exposed when in said access position; and one of said base and said moving plate having walls, abutting surfaces on the other for forming an enclosed chamber in said stowed position to protect and enclose said electrical connection.

2. An electrical connector as recited in claim 1, wherein said electrical connections are fixed for movement with said moving plate, and are enclosed by said fixed base in said stowed position and face outwardly of said base in said access position.

3. An electrical connector as recited in claim 1, wherein said base includes at least one hole to receive an attachment member to secure said base to a vehicle, said hole being centered on an angle which will be at an acute angle relative to the vertical when the fixed base is fixed to a vehicle.

4. An electrical connector as recited in claim 2, wherein said moving plate pivots relative to said base.

5. An electrical connector as recited in claim 4, wherein said base has a front wall extending downwardly, and said moving plate includes a forward connector plate which receives said electrical connections, said forward connector plate being received behind said front wall of said base in said stowed position.

6. An electrical connector as recited in claim 4, wherein a portion of said moving plate extends rearwardly of a pivot connection to said base, and said portion contacting said base in said access position, preventing further pivoting of said moving plate.

7. An electrical connector as recited in claim 1, wherein said electrical connections are fixed for movement with said moving plate, and said electrical connections are attached to wires secured to said moving plate by locking fingers extending into locking spaces on said wires, a wedge plate biasing said locking fingers into said locking spaces.

8. An electrical connector as recited in claim 7, wherein said wedge plate includes a plurality of finger wedges which are positioned between said locking fingers to force said locking fingers away from a relaxed position where they are not received in said locking spaces to an actuated holding position where they are received in said locking spaces, holding said wires within said electrical connector.

9. An electrical connector as recited in claim 7, wherein said wedge plate further includes an ear which is snapped into said base at a position adjacent a rear of said moving plate, wherein said moving plate includes a plurality of wells each adapted to receive a wire, and said ear extending into said wells to hold said wires in their respective wells.

10. An electrical connector as recited in claim 9, wherein said moving plate includes an enclosure having forward and rear walls, said connector plate being formed in said forward wall, and a plurality of holes being formed in said rear wall, with said finger wedges extending through said holes in said rear wall and said wires also extending through respective holes in said rear wall.

11. An electrical connector comprising:

a first housing member including forward and rear walls, and a plurality of wires secured in a connector plate adjacent said forward wall, said rear wall including holes for passage of said wires toward said forward wall, said rear wall also including holes for passage of a finger wedge, said first housing member including a plurality of resilient locking fingers selectively biased into a locking space adjacent said wires and a wedge plate having a rear portion, said wedge plate further including integral finger wedges extending forwardly from said rear portion, said finger wedges selectively passing through said holes in said rear wall, said rear portion remaining outwardly of said holes in said rear wall, said finger wedges being received in contact with said locking fingers, and biasing said locking fingers into said locking spaces to secure said wires in said connector plate.

12. An electrical connector as recited in claim 11, wherein there are at least two of said finger wedges, each of said finger wedges forcing two locking fingers in opposed directions into locking spaces in respective wires.

13. An electrical connector as recited in claim 11, wherein said wedge plate includes an ear at a rearward position which is snapped into a recess in said first housing member.

14. An electrical connector as recited in claim 13, wherein said first housing member includes a plurality of wells rearwardly of said rear wall, said wires each being received in respective ones of said wells, and said ear from said wedge plate locking into a recess above said wells to secure said wires in their respective wells.

15. An electrical connector for a towed vehicle comprising:

a fixed base adapted to be fixed to a towing vehicle;

a moving plate secured to said base; and electrical connections fixed to said moving plate, said moving plate being moveable relative to said base from a stowed position to an access position, said electrical connections being protected and enclosed by the combination of said moving plate and said base when in said stowed position, and being exposed when in said access position, said electrical connections being received within a connector plate adjacent a forward end of said moving plate, said moving plate including a rear wall including holes for passage of said wires towards said forward wall, said rear wall also including holes for passage of a plurality of finger wedges, said moving plate including a plurality of resilient locking fingers selectively biased into locking spaces adjacent said wires, and a wedge plate attached to said moving plate, said wedge plate including finger wedges selectively passing through said holes in said rear wall, said finger wedges being received in contact with said locking fingers, and biasing said locking fingers into said locking spaces to secure said wires in said connector plate.

16. An electrical connector as recited in claim 15, wherein there are at least two of said finger wedges, each of said finger wedges forcing two locking fingers in opposed directions into locking spaces and respective wires.

17. An electrical connector as recited in claim 15, wherein said wedge plate includes an ear at a rearward position which is snapped into a recess in said moving plate, said moving plate including a plurality of wells rearwardly of said rear wall, said wires each being received in respective ones of said wells, and said ear from said wedge plate locking into a recess above said wells to secure said wires in their respective wells.

18. An electrical connector as recited in claim 15, wherein said moving plate pivots relative to said fixed base.

19. An electrical connector as recited in claim 18, wherein said fixed base has a forward wall extending downwardly, and said connector plate being received behind said front wall of said fixed base in said stowed position.

20. An electrical connector as recited in claim 18, wherein said moving plate extends rearwardly beyond a pivot connection to said base, and a portion of said moving plate contacting said fixed base in said access position providing a stop against further movement.

* * * * *